United States Patent
Rogers et al.

(10) Patent No.: US 9,910,788 B2
(45) Date of Patent: Mar. 6, 2018

(54) CACHE ACCESS STATISTICS ACCUMULATION FOR CACHE LINE REPLACEMENT SELECTION

(71) Applicants: Advanced Micro Devices, Inc., Sunnyvale, CA (US); ATI Technologies ULC, Markham (CA)

(72) Inventors: Philip J. Rogers, Austin, TX (US); Benjamin T. Sander, Austin, TX (US); Anthony Asaro, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 234 days.

(21) Appl. No.: 14/861,055

(22) Filed: Sep. 22, 2015

(65) Prior Publication Data

US 2017/0083455 A1    Mar. 23, 2017

(51) Int. Cl.
*G06F 12/121*    (2016.01)
*G06F 12/0891*   (2016.01)
*G06F 12/1081*   (2016.01)
*G06F 13/28*     (2006.01)
*G06F 12/12*     (2016.01)

(52) U.S. Cl.
CPC ........ *G06F 12/121* (2013.01); *G06F 12/0891* (2013.01); *G06F 12/1081* (2013.01); *G06F 13/28* (2013.01); *G06F 12/12* (2013.01); *G06F 2212/656* (2013.01)

(58) Field of Classification Search
CPC .... G06F 12/121; G06F 12/0891; G06F 13/28; G06F 2212/656; G06F 2212/69; G06F 12/1081
See application file for complete search history.

(56) References Cited

U.S. PATENT DOCUMENTS

2011/0320729 A1* 12/2011 Bronson ............. G06F 12/0895
                                                    711/130

OTHER PUBLICATIONS

U.S. Appl. No. 14/747,980, filed Jun. 23, 2015, listing Benjamin T. Sander et al. as inventors, entitled "Access Log and Address Translation Log for a Processor".

* cited by examiner

*Primary Examiner* — Ernest Unelus (57) ABSTRACT

A processor device includes a cache and a memory storing a set of counters. Each counter of the set is associated with a corresponding block of a plurality of blocks of the cache. The processor device further includes a cache access monitor to, for each time quantum for a series of one or more time quanta, increment counter values of the set of counters based on accesses to the corresponding blocks of the cache. The processor device further includes a transfer engine to, after completion of each time quantum, transfer the counter values of the set of counters for the time quantum to a corresponding location in a system memory.

20 Claims, 4 Drawing Sheets

CACHE ACCESS STATISTICS ACCUMULATION FOR CACHE LINE REPLACEMENT SELECTION

BACKGROUND

Field of the Disclosure

The present disclosure relates generally to caching in processing systems and, more particularly, to selection of cache lines for replacement in processing systems.

Description of the Related Art

A processing system may utilize a faster, smaller memory as a software-managed cache for caching data from a larger, slower memory. When a memory location is accessed repeatedly, a copy of the contents of the memory location may be stored to a corresponding line of the cache. When the cache is over-subscribed, certain cache lines are selected for eviction to make room for incoming cache lines. Most conventional cache line replacement algorithms used to select the cache lines for eviction are implemented in hardware and are based on a simple least recently used (LRU) algorithm that relies on only a relatively short window of activity. Furthermore, the replacement algorithm is fixed, that is, cannot be updated or changed. Moreover, such hardware-implemented algorithms require storage of access information in a cache tag per cache line, thereby reducing the amount of the faster, smaller memory that can be utilized for caching data, as well as increasing the cost of implementation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate example techniques for accumulating cache access statistics over one or more time quanta for access by a software cache management module, which may employ any of a range of cache line replacement algorithms to select cache lines of a cache for eviction. A cache access monitor partitions the cache into a plurality of blocks (each block comprising one or more cache lines of the cache) and maintains a set of counters in an on-chip memory, with each counter assigned to a corresponding block of the plurality of blocks. For each time quantum, the cache access monitor resets the counters and then increments the counters for corresponding memory accesses occurring during the time quantum. In some embodiments, rather than tracking every memory access, the cache access monitor may sample the memory accesses based on a specified sampling frequency, which may be software programmable. Further, in some embodiments, the counters may be clamped to a maximum count value, which also may be software programmable. At the end of the time quantum, a copy of the counter values of the set of counters may be stored to a system memory for access and use by the software cache management module in selecting cache lines for eviction or other cache management operations.

To facilitate the efficient transfer of a copy of the counter values to the system memory, in some embodiments the set of counters is double buffered in the on-chip memory. Thus, the cache access monitor may alternate between two instances of the set of counters for each successive time quantum, thereby allowing a direct memory access (DMA) engine or other transfer engine to copy the counter values of the inactive instance of the set of counters (that is, the cache access statistics for the previous time quantum) to the system memory while the cache access monitor is utilizing the active instance of the set of counters for accumulating cache access statistics for the current time quantum. Further, to provide the software cache management module access to a long window of cache access statistics, a ring buffer or other buffer structure of X entries (X>=2) may be implemented in the system memory so that a sliding window of cache access statistics for the most recent X time quanta may be accumulated and made available to the software module for use in its cache management operations.

Figure 1:
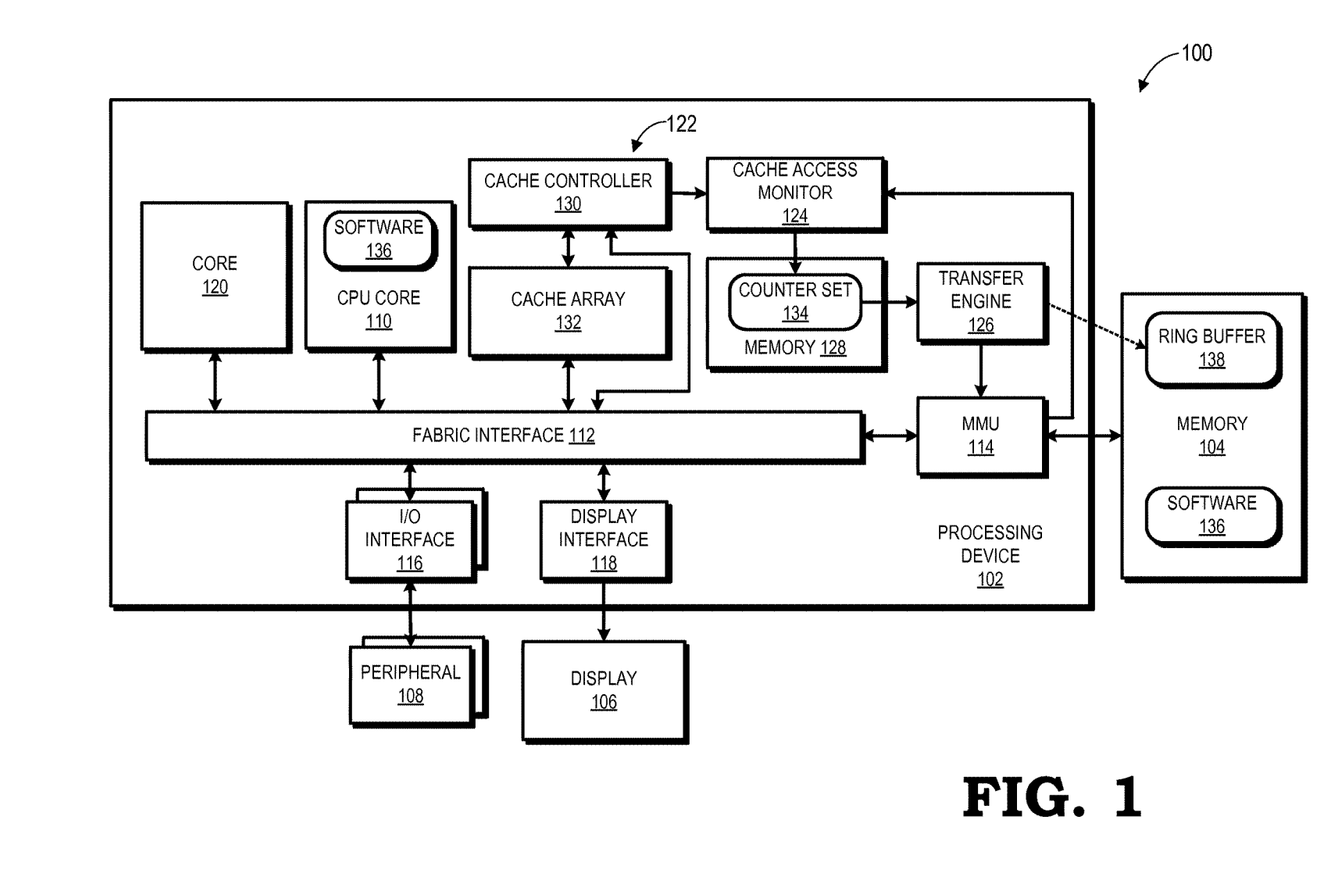
FIG. 1 is a block diagram of an electronic device implementing a processing system with cache access statistic gathering in accordance with some embodiments.

FIG. 1 illustrates a computing system 100 utilizing cache access statistic accumulation in accordance with some embodiments. The computing system 100 may be implemented in any of a variety of electronic devices, such as, for example, a desktop computer, laptop computer, a tablet computer, a computing-enabled cellular phone, a gaming console, a personal digital assistant, a computing-enabled watch or other computing enabled wearable device, and the like. In the depicted example, the computing system 100 includes a processing device 102 coupled to a system memory 104 (also referred to as a "host" memory), a display 106, and one or more peripheral devices 108 (e.g., a keyboard, a mouse, a printer, and the like). The processing device 102 may be implemented as a single integrated circuit, or as a combination of multiple integrated circuits, such as a system-on-a-chip (SoC).

The processing device 102 includes one or more processor cores coupled to a interconnect fabric 112, which in turn is coupled to a memory management unit (MMU) 114, one or more input/output (I/O) interfaces 116, and a display interface 118. The one or more processor cores include a central processing unit (CPU) core 110, and further may include one or more additional processor cores 120. The one or more processor cores 120 comprise any of a variety of processing components configured to execute software or firmware instructions. Examples of such functional units include graphics processing units (GPUs), digital signal processors (DSPs), parallel processing units (PPUs), microcontrollers, and the like. The processing device 102 further includes a cache hierarchy having one or more caches 122 coupled to the fabric interface 112, a cache access monitor 124, a transfer engine 126, and an on-chip memory 128. In implementations with a plurality of processor cores, the cache 122 may be shared by multiple processor cores, or each processor core may have a separate, dedicated cache 122.

As depicted, the cache 122 includes a cache controller 130 and a corresponding cache array 132. The cache array 132 comprises a plurality of cache lines (not shown in FIG. 1), each cache line to store data from a corresponding portion of the memory 104, and the cache controller 130 operates to fetch the corresponding data from memory 104 for storage in a corresponding cache line and, in the event of oversubscription of the cache array 132, to evict selected cache lines to a lower-level cache (not shown in FIG. 1) or to the memory 104 so as to make room for incoming pages to be cached. Typical caches utilize cache lines of thirty-two to sixty-four bytes, and thus the memory portion corresponding to a cache line may also be thirty-two to sixty-four bytes. However, in some implementations, the cache array 132 may implement larger cache lines, such as, for example, cache lines of four kilobytes or even sixty-four kilobytes or larger, thereby allowing each cache line to store an entire page of memory or even multiple pages of memory.

In some embodiments, the operation of the cache controller 130 is controlled by, or directed by, a software cache management module 136. The software cache management module 136 comprises a set of executable instructions stored in the system memory 104 or other non-transitory computer readable storage medium and which, when executed by the CPU core 110, manipulate the CPU core 110 to perform various cache management operations as described herein. At least one of these cache management operations includes the selection of cache lines for eviction (that is, the selection of "victim" cache lines), for which the software cache management module 136 may implement one or more cache line replacement algorithms that utilize cache access statistics to identify which cache lines are predicted or estimated to be more likely or less likely to be accessed going forward, and select victim cache lines accordingly.

To facilitate the cache line replacement operations of the software cache management module 136, in at least one embodiment the cache access monitor 124 accumulates cache access statistics for one or more time quanta and makes these cache access statistics available to the software cache management module 136 for use in the cache line eviction selection process. To this end, the cache access monitor 124 maintains a counter set 134 comprising a plurality of counters in the on-chip memory 128, which may comprise, for example, a static random access memory (SRAM), a register file, and the like. The cache array 132 is divided into a set of blocks, with each block comprising one or more cache lines of the cache array 132. Each counter of the counter set 134 is associated with a corresponding block of the set of blocks, and is implemented as a set of one or more bits representing a counter value. The counter value in turn represents a statistical measure or indication of a number of accesses to the one or more cache lines of the corresponding block. Thus, at the start of each time quantum, the cache access monitor 124 resets the counters of the counter set 134. During the time quantum, the cache access monitor 124 monitors memory accesses via input from one or both of the cache controller 130 or the MMU 114. For each memory access for at least a subset of the identified memory accesses sampled based on a programmable sampling frequency, the cache access monitor 124 identifies the block of the cache associated with the memory location targeted by the memory access and increments the corresponding counter of the counter set 134 in the on-chip memory 128. The counter may be clamped to a maximum count value, which may be programmable or which may be limited by the bit size of the counter. In this manner, the counters of the counter set 134 are updated during the time quantum to reflect the cache lines accessed during the time quantum and, depending on the maximum count value, the frequency of access or number of accesses to each cache line during the time quantum.

At the end of the time quantum, the transfer engine 126 transfers a copy of the final counter values of the counter set 134 to the system memory 104. The counter values then are reset to zero and the cache access statistics accumulation process begins anew for the next time quantum. As described in greater detail below, in some embodiments the counter set 134 is double buffered such that while one instance of the counter set 134 is being updated during the current time quantum (hereinafter, the "active counter set"), the other instance of the counter set 134 representing the counter values for the previous time quantum (hereinafter, the "inactive counter set") may be transferred to the system memory 104. In at least one embodiment, a ring buffer 138 or other multiple-entry data structure is employed in the system memory 104 so as to store the cache access statistics represented by the counter values of the counter set 134 for the previous X time quanta, where X is an integer greater than one and which represents the number of entries in the ring buffer 138 or other data structure. A write pointer or write offset used by the transfer engine 126 to store the cache access statistics for the most recently-completed time quantum (and thus indicating the last position written to by the transfer engine 126) may be stored in the memory 104 or otherwise made available to the software cache management module 136 so that the software cache management module 136 can identify the most recent entry of the ring buffer 138. For ease of illustration, reference is made primarily to the ring buffer 138 as the data structure storing the counter values for a series of time quanta, but the present disclosure is not limited to this particular implementation.

The history of cache access statistics for up to X prior time quanta stored in the ring buffer 138 are made available to the software cache management module 136, which may use a range of cache line replacement algorithms for selecting victim cache lines. Because multiple time quanta may be represented, such cache line replacement algorithms are not limited to use of cache access information for a short duration of time, but instead may span multiple time quanta. Moreover, as the cache access statistics are provided as a set of counter values stored in the system memory 104 rather than as bits in a cache tag, the cache line replacement algorithm does not need to be fixed at hardware design time. Thus, the cache line replacement algorithms may be updated with improved or revised versions during validation, during provisioning, or in the field. To illustrate, the software cache management module 136 may be implemented as a software driver for an operating system executed by the processing device 102, and the cache line replacement algorithm may be updated as part of the process of updating this software driver while the computing system 100 is in the field.

Figure 2:
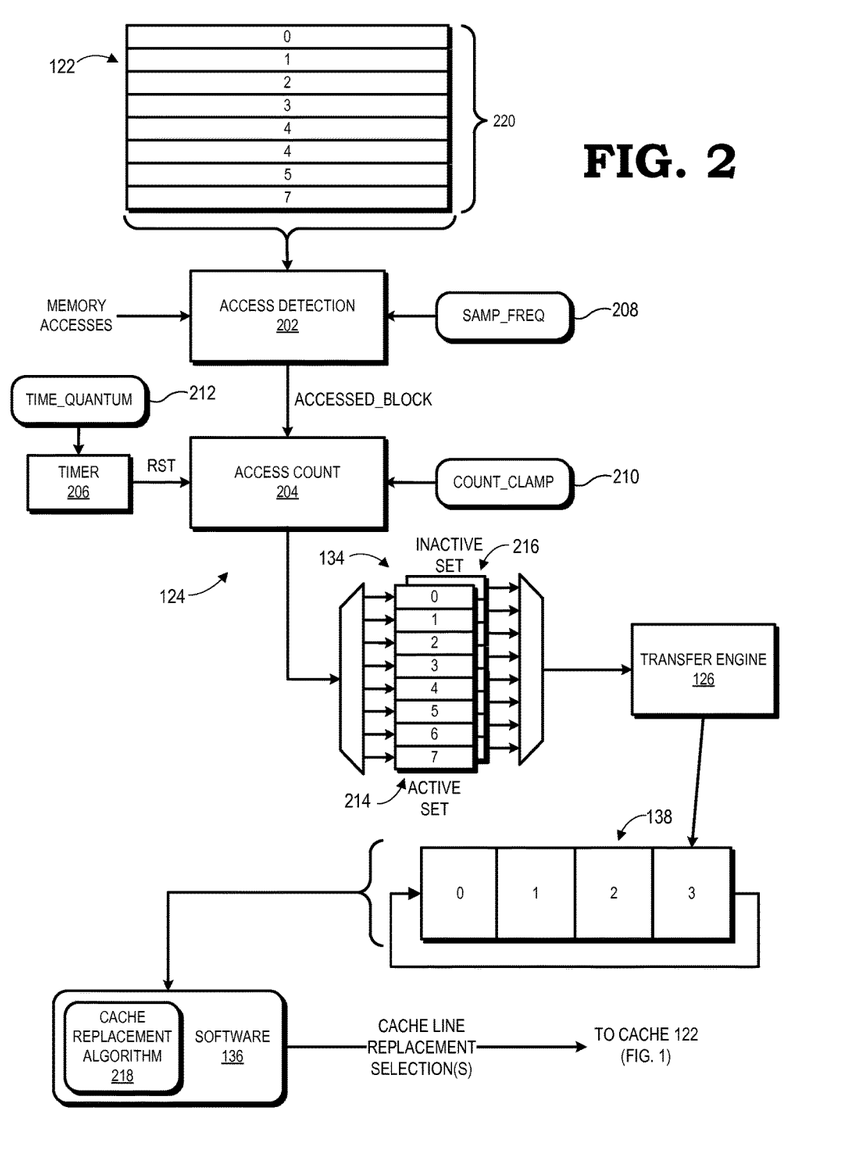
FIG. 2 is a block diagram illustrating a portion of the processing system of FIG. 1 in greater detail in accordance with some embodiments.

FIG. 2 illustrates the cache access monitor 124, counter set 134, transfer engine 126, and ring buffer 138 in greater detail. The cache access monitor 124 comprises an access detection component 202, an access count component 204, a timer 206, storage locations 208, 210, 212. The storage locations 208, 210, 212 store various parameters for the operation of the cache access monitor 124 and may comprise software-programmable storage locations (e.g., registers) that may be modified during operation, fixed storage locations (e.g., hardcoded storage locations or one-time-programmable memory) that are set during bring-up, validation, or provisioning, or a combination thereof. The access count component 204 is coupled to the storage location 208 and is further coupled to one or both of the MMU 114 and the cache controller 130 to monitor memory accesses. The access count component 204 is coupled to the access detection component 202, the timer 206, and the storage location 210. As noted above, the counter set 134 is implemented in the on-chip memory 128 (FIG. 1) and is accessible to both the access count component 204 and the transfer engine 126. In the depicted example, the counter set 134 is double buffered, and thus includes two instances of the same set of counters: counter set 214 and counter set 216. The transfer engine 126 also has access to the ring buffer 138 implemented in the system memory 104. The ring buffer 138 is accessible by the software cache management module 136 for use by one or more cache line replacement algorithms 218.

During operation, the access detection component 202 partitions the cache lines of the cache array 132 into a set 220 of blocks, each block representing a corresponding subset of one or more of the cache lines of the cache array 132. In the depicted example, the cache array 132 is partitioned into eight blocks, blocks 0-7, for ease of illustration. However, a typical implementation likely would have a far larger number of blocks. The access detection component 202 then communicates with the MMU 114 or the cache controller 130 to monitor memory accesses initiated by the CPU core 110, other processor cores 120, or the peripheral devices 108 to determine which block of the set 220 is associated with the cache line targeted by the memory access. In some embodiments, rather than perform this operation for each memory access, the access detection component 202 samples the memory accesses based on a sampling frequency specified by a value, denoted SAMP_FREQ, programmed in the storage location 208. To illustrate, if a value of "8" is stored to the storage location 208 (SAMP_FREQ=8), then the access detection component 202 would select every eighth memory access for processing. For each selected memory access, the block of the cache associated with the memory access is signaled to the access count component 204 using a signal denoted "ACCESSED_BLOCK".

The access count component 204 operates to update the counter set 134 to reflect the cache accesses detected by the access detection component 202 during the current time quantum. The transition from one time quantum to the next may be indicated through assertion of a signal denoted "RST" by the timer 206. The length of the time quantum implemented by the timer 206 may be programmed by writing a value, denoted TIME_QUANTUM, to the storage location 212. As noted above, the counter set 134 is double buffered as two counter sets 214 and 216. As such, the access count component 204 alternates between the counter set 214 and the counter set 216 for gathering cache access information for each successive time quantum. The counter set in use for accumulating cache access statistics during the current time quantum is referred to herein as the "active counter set" and the counter set not in use for accumulating cache access statistics during the current time quantum is referred to herein as the "inactive counter set". In response to the assertion of the signal RST signaling the start of the next time quantum, the access count component 204 switches counter sets, with the counter set that was the active counter set during the previous time quantum becoming the inactive counter set for the current time quantum, and the counter set that was the inactive counter set during the previous time quantum becoming the active counter set for the current time quantum. Further, the access count component 204 flushes the now-active counter set of any counter time values from an earlier time quantum by resetting the counter values of the active counter set. Thereafter, for each block access signaled by the access detection component 202 through the signal ACCESSED_BLOCK, the access count component 204 increments the count value of the corresponding counter of the active counter set. To illustrate, in the example of FIG. 2, each of the counter sets 214 and 216 includes eight counters, denoted "counters 0-7", for the eight blocks 0-7 of the set 220, with counter 0 associated with block 0, counter 1 associated with block 1, and so forth. Thus, a sampled memory access to a cache line associated with block 2 would be signaled by the access detection component 202 via the signal ACCESSED_BLOCK, and in response the access count component 204 would increment the count value stored in counter 2 to reflect this access.

In some embodiments, the access count component 204 clamps the counters so that they cannot exceed a maximum count value represented by a value COUNT_CLAMP programmed at the storage location 210. Thus, using the previous example, if the counter value of counter 2 was already at the maximum count value, the access count component 204 would not increment the counter 2 further in response to the signal ACCESSED_BLOCK indicating another access to block 2. As another example, the value COUNT_CLAMP can be programmed to a value of 1 so that each counter has a maximum value of 1, and thus each counter may be implemented using a single bit that indicates whether the corresponding block has been accessed (bit=1) or not accessed (bit=0) during the current time quantum.

As noted above, the transfer engine 126 operates to transfer a copy of the counter values of the counter set 134 to the ring buffer 138 after the completion of each time quantum, and the current value of the write pointer or write offset of the ring buffer 138 is stored to system memory 104 so as to be available to the software cache management module 136. In the double buffered implementation of FIG. 2, when the timer 206 signals the transition to the next time quantum via the assertion of the signal RST, the access count component 204 switches the active counter set to the inactive counter set and vice versa and begins tracking cache accesses for the new time quantum. After this switch has occurred, the transfer engine 126 can begin transferring the count values of the counters of the now-inactive counter set to the next entry in the ring buffer 138. In the example of FIG. 2, the ring buffer 138 has four entries, entries 0-3, thereby giving the cache line replacement algorithm 218 employed by the software cache management module 136 access to the cache access statistics accumulated by the cache access monitor 124 for up to a series of four prior time quanta.

Figure 3:
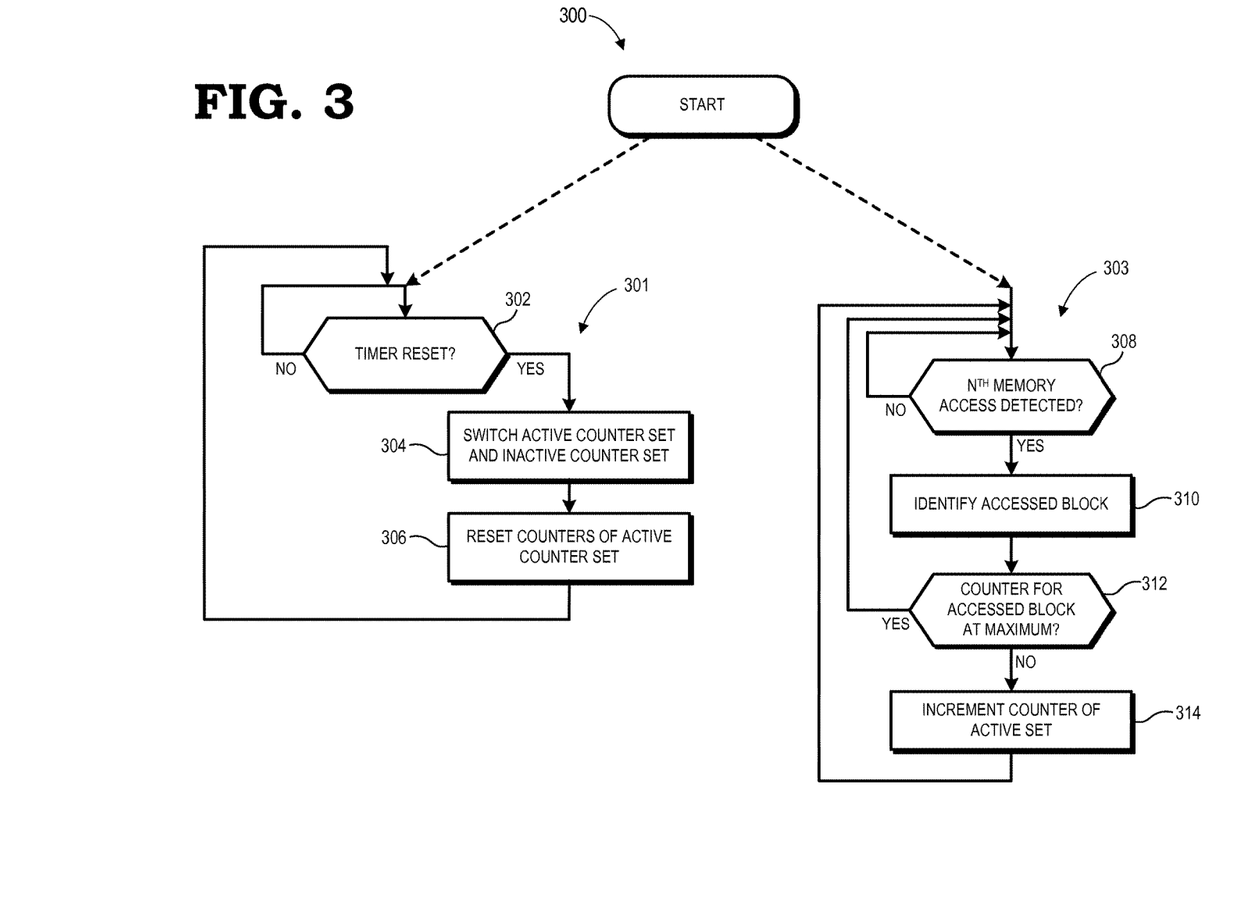
FIG. 3 is a flow diagram illustrating a method for accumulating cache access statistics for multiple time quanta in accordance with some embodiments.

FIG. 3 illustrates an example method 300 of operation of the cache access monitor 124 of FIG. 2 in accordance with at least one embodiment of the present disclosure. The method 300 has two sub-processes, counter preparation sub-process 301 and access tracking sub-process 303, which operate in parallel.

As described above, the cache access monitor 124 accumulates cache access statistics on a per-time-quantum basis, and the start of each time quantum (or the end of the previous time quantum) is signaled by the timer 206 via assertion of the signal RST. Accordingly, the counter preparation sub-process 301 initiates at block 302 with the access count component 204 monitoring the state of the signal RST. In response to detecting that the signal RST has been asserted (signaling the end of one time quantum and the start of the next time quantum), at block 304 the access count component 204 switches between the double buffered counter sets 214, 216 so that the one of the counter sets 214, 216 that was the active counter set for the time quantum that just ended becomes the inactive counter set for the time quantum that just started and the other one of the counter sets that was the inactive counter set for the previous time quantum becomes the active buffer set for the current time quantum. Thereafter, at block 306 the access count component 204 resets the counters of the active counter set to zero or other initial value. The counter preparation sub-process 301 then returns to block 302 to await the next time quantum transition.

In some embodiments, the cache access monitor 124 tracks cache accesses on a statistical sampling basis such that only every $N^{th}$ memory access is sampled for inclusion in the cache access statistics being accumulated for the current time quantum. Accordingly, the access tracking sub-process 303 initiates at block 308 with the access detection component 202 determining the sampling frequency based on the value SAMP_FREQ (that is, N=SAMP_FREQ) stored in the storage location 208 and then monitoring for memory accesses and selecting every $N^{th}$ detected memory access for further processing. In response to detecting an $N^{th}$ memory access, at block 310 the access detection component 202 identifies which block of the set 220 of cache blocks is associated with the memory location targeted by the selected memory access and signals the identified block to the access count component 204 via the signal ACCESSED_BLOCK. At block 312, the access count component 204 identifies the counter of the active counter set that is associated with the identified block and then determines whether the current counter value of the identified counter is at the maximum count value set by the value COUNT_CLAMP in storage location 210. If the current counter value is below COUNT_CLAMP, then at block 314 the access count component 204 increments the counter value or otherwise updates the counter value to reflect the memory access. The flow of the access tracking sub-process 303 then returns to block 308 to await detection of the next $N^{th}$ memory access.

Figure 4:
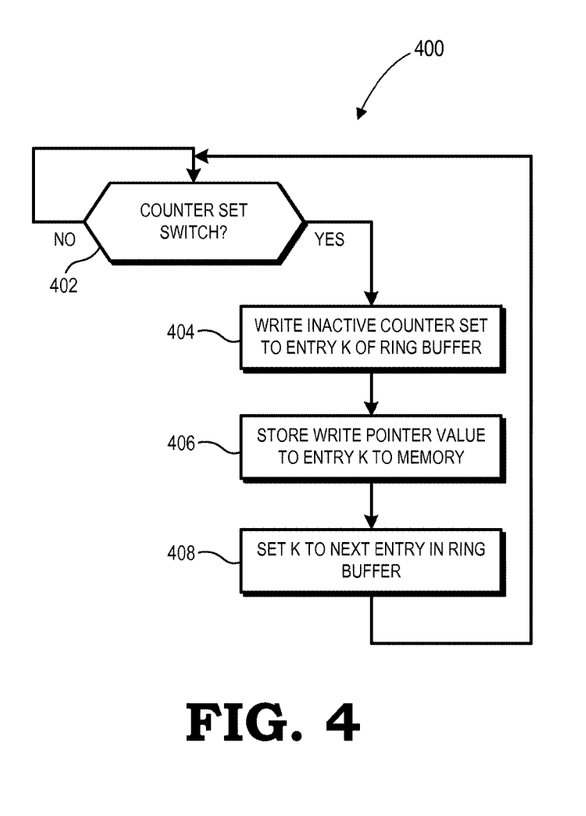
FIG. 4 is a flow diagram illustrating a method for transferring accumulated cache access statistics to a system memory in accordance with some embodiments.

FIG. 4 illustrates an example method 400 of operation of the transfer engine 126 of FIG. 2 in accordance with at least one embodiment of the present disclosure. As described above, the transfer engine 126 operates to transfer the counter values accumulated for the previous time quantum to the ring buffer 138 or other data structure in the system memory 104 so as to make the cache access statistics represented by the counter values available to the software cache management module 136 for use in a cache line eviction selection process. Further, as also noted above, the access count component 204 switches between two instances of the counter set 134 in a double-buffered configuration. Thus, when the access count component 204 switches the counter set that was the active counter set during the previous time quantum to being the inactive counter set for the next time quantum, the now inactive counter set is no longer in use by the access count component for the current time quantum and thus is available for access by the transfer engine 126 in a manner that will not interfere with the counter incrementing process of the access count component 204. To this end, the method 400 initiates at block 402 with the transfer engine 126 waiting for an indication that the access count component 204 has switched counter sets in response to a time quantum transition. In some embodiments, this indication can be implemented via signaling provided by the access count component 204 to the transfer engine 126 when the access count component 204 has completed the active counter set/inactive counter set switch. In other embodiments, the transfer engine 126 may monitor the signal RST such that when the signal RST is asserted the transfer engine 126 assumes that the access count component 204 has completed, or will complete shortly, the counter set switch.

In response to detecting the counter set switch, at block 404 the transfer engine 126 accesses the counter values stored in the inactive counter set and transfers a copy of these counter values to the next entry K in the ring buffer 138 using the write pointer or write offset maintained for the ring buffer 138. At block 406 the transfer engine 126 stores the current value of the write pointer or write offset (which points to the location of entry K in the ring buffer 138) to a specified location in the system memory 104 so that the software cache management module 136 can access this specified location and determine the most recently updated entry of the ring buffer 138 from the write pointer/offset value stored therein. Thereafter, at block 408 the transfer engine 126 updates the write pointer or write offset to point to the next entry in the ring buffer 138 (that is, K=K+1 mod X). The flow of method 400 then returns to block 402 to await the next indication that a counter set switch has occurred.

Figure 5:
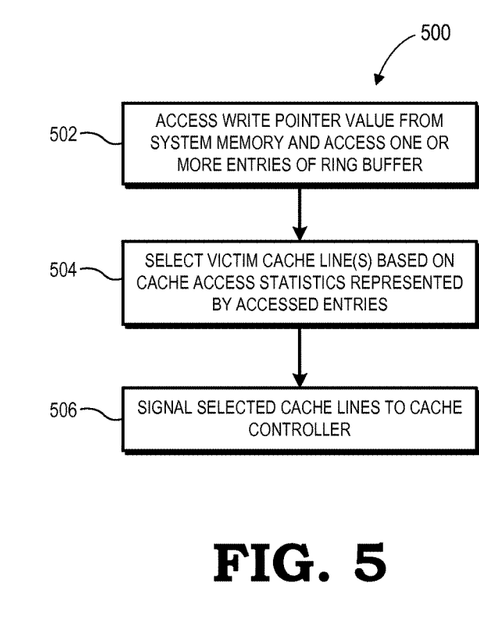
FIG. 5 is a flow diagram illustrating a method for using accumulated cache access statistics for selecting one or more cache lines for eviction in accordance with some embodiments.

FIG. 5 illustrates an example method 500 for utilizing the accumulated cache access statistics in the system memory 104 for cache line eviction selection or other cache management operations in accordance with at least one embodiment. For each iteration of the method 400 of FIG. 4 described above, an entry of the ring buffer 138 is populated with the counter values from the previous time quantum, and thus with X entries total the ring buffer 138 can hold a history of the cache access statistics for a series of up to X time quanta. Although FIG. 2 illustrates a simplified example of the ring buffer 138 with only four entries (X=4), in a typical implementation the ring buffer 138 may implement a larger number of entries, thereby allowing the ring buffer 138 to represent a relatively long history of cache access statistics. To this end, at block 502 the software cache management module 136 accesses the specified location of the memory 104 that stores the most recent value of the write pointer or write offset for the ring buffer 138 (see block 406 of FIG. 4) and uses the value stored therein to identify and access the most recently modified entry of the ring buffer 138 and the counter values stored therein, and may also use this value to access the counter values stored at one or more prior entries of the ring buffer 138.

At block 504, the cache line replacement algorithm 218 uses the cache access statistics represented by the accessed counter values for one or more previous time quanta to select one or more cache lines for eviction from the cache 122 in the event that the cache 122 is oversubscribed. To illustrate, the cache line replacement algorithm 218 may use the counter values to identify those cache lines that are less frequently accessed on average over the time period represented by the accessed time quanta and select one or more victim cache lines from the identified cache lines. As another example, the cache line replacement algorithm 218 may use the counter values to identify cache lines that are showing an increased frequency of access over the time period represented by the accessed time quanta, and thus prevent these identified cache lines from being selected for eviction. Similarly, if a number of lines are showing no access over a number of time quanta, they may be chosen for eviction. At block 506, the software cache management module 136 signals the selected victim cache lines to the cache controller 130, which then evicts the selected victim cache lines as necessary to make room for incoming cache lines.

In some embodiments, the apparatus and techniques described above are implemented in a system comprising one or more integrated circuit (IC) devices (also referred to as integrated circuit packages or microchips), such as the processing device 102 described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory, tangible storage medium, or combination of non-transitory, tangible storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a computing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
    a processor device comprising:
        a cache;
        a set of counters, each counter of the set associated with a corresponding block of a plurality of blocks of the cache;
        a cache access monitor coupled to the cache and the set of counters, the cache access monitor to, for each time quantum for a series of one or more time quanta, adjust counter values of the set of counters based on accesses to the corresponding blocks of the cache; and
        a transfer engine to, after completion of each time quantum, transfer the counter values of the set of counters for the time quantum to a corresponding location in a system memory.

2. The system of claim 1, wherein the cache access monitor comprises:
    a first programmable storage location to store a first value representative of a memory access sampling frequency;
    an access detection component coupled to the first programmable storage location, the access detection component to select every $N^{th}$ memory access, N being an integer based on the first value; and
    an access count component coupled to the access detection component, the access count component to, for each memory access selected by the access detection component, identify a counter of the set of counters associated with the block of the cache accessed by the selected memory access and increment the identified counter.

3. The system of claim 2, wherein the cache access monitor further comprises:
    a second programmable storage location coupled to the access count component, the second programmable storage location to store a second value representative of a maximum count value; and wherein the access count component is to clamp the counters of the set of counters to the maximum count value.

4. The system of claim 2, wherein the cache access monitor further comprises:
a timer to assert a signal to indicate a start of each time quantum of the series of one or more time quanta; and
wherein the access count component is to reset the count values of the set of counter values responsive to the timer asserting the signal.

5. The system of claim 1, wherein:
the corresponding location in the system memory is a next entry of a ring buffer in the system memory; and
wherein the transfer engine updates the next entry of the ring buffer responsive to completing transfer of the counter values of the set of counters for a time quantum.

6. The system of claim 5, further comprising:
a processor core executing a software module, the software module having instructions to manipulate the processor core to access one or more entries of the ring buffer and to select one or more cache lines of the cache for replacement based on the accessed one or more entries of the ring buffer.

7. The system of claim 1, further comprising:
a processor core executing a software module, the software module having instructions to manipulate the processor core to access from the system memory the counter values stored for each time quantum of at least a subset of the series and to select one or more cache lines of the cache for replacement based on the accessed counter values.

8. The system of claim 1, wherein the transfer engine comprises a direct memory access (DMA) engine.

9. The system of claim 1, further comprising:
the system memory coupled to the processing device.

10. In a computing system, a method comprising:
storing a set of counters at a memory of a processing device, each counter of the set associated with a corresponding block of a plurality of blocks of a cache;
for each time quantum of a series of one or more time quanta, incrementing counter values of the set of counters based on accesses to corresponding blocks of the cache during the time quantum; and
after completion of each time quantum, transferring a copy of the counter values of the set of counters for the time quantum to a corresponding location in a system memory.

11. The method of claim 10, further comprising:
programming a first storage location with a first value representative of a memory access sampling frequency;
selecting every $N^{th}$ memory access, N being an integer based on the first value; and
wherein incrementing counter values of the set of counters comprises:
for each selected memory access, identifying a counter of the set of counters associated with the block of the cache accessed by the selected memory access and incrementing the identified counter.

12. The method of claim 11, further comprising:
programming a second storage location with a second value representative of a maximum count value; and
wherein incrementing counter values comprises clamping the counter values to the maximum count value.

13. The method of claim 10, wherein:
the corresponding location in the system memory is a next entry of a ring buffer in the system memory.

14. The method of claim 10, further comprising:
accessing, from the system memory, the counter values stored for each time quantum of at least a subset of the series; and
selecting one or more cache lines of the cache for replacement based on the accessed counter values.

15. In a computing system, a method comprising:
for a first time quantum:
resetting each counter of a first set of counters stored in an on-chip memory of a processor device, each counter of the first set associated with a corresponding block of a plurality of blocks of a cache of the processing device; and
for each $N^{th}$ memory access during the first time quantum, incrementing a counter value of the counter of the first set corresponding to a block associated with the $N^{th}$ memory access;
responsive to a transition from the first time quantum to a second time quantum, transferring the counter values of the first set of counters to a first location in a system memory;
for the second time quantum:
resetting each counter of a second set of counters stored in the memory, each counter of the second set associated with a corresponding block of the cache; and
for each $N^{th}$ memory access during the second time quantum, incrementing a counter value of the counter of the second set corresponding to the block of cache associated with the $N^{th}$ memory access; and
responsive to a transition from the second time quantum to a third time quantum, transferring the counter values of the second set of counters to a second location in the system memory.

16. The method of claim 15, further comprising:
executing a software module at the processor device to manipulate the processor device to access the counter values at the first location and the counter values at the second location and to select at least one cache line of the cache for replacement based on the accessed counter values.

17. The method of claim 15, further comprising:
for the third time quantum:
resetting each counter of the first set of counters; and
for each $N^{th}$ memory access during the third time quantum, incrementing a counter value of the counter of the first set corresponding to the block of cache associated with the $N^{th}$ memory access; and
responsive to a transition from the third time quantum to a fourth time quantum, transferring the counter values of the first set of counters to a third location in the system memory.

18. The method of claim 17, further comprising:
executing a software module at the processor device to manipulate the processor device to access the counter values at the first location, the counter values at the second location, and the counter values at the third location and to select at least one cache line of the cache for replacement based on the accessed counter values.

19. The method of claim 15, wherein N is a programmable value.

20. The method of claim 15, wherein incrementing a counter value comprises clamping the counter value at a programmable maximum count.

* * * * *